United States Patent
Christiansen et al.

(10) Patent No.: US 10,896,020 B2
(45) Date of Patent: Jan. 19, 2021

(54) SYSTEM FOR PROCESSING SERVICE REQUESTS RELATING TO UNSATISFACTORY PERFORMANCE OF HEARING DEVICES, AND COMPONENTS OF SUCH SYSTEM

(71) Applicant: GN Hearing A/S, Ballerup (DK)

(72) Inventors: Kim Kris Christiansen, Ballerup (DK); Jesper Lund Nielsen, Ballerup (DK)

(73) Assignee: GN Hearing A/S, Ballerup (DK)

( * ) Notice: Subject to any disclaimer, the term of this patent is extended or adjusted under 35 U.S.C. 154(b) by 17 days.

(21) Appl. No.: 16/134,670

(22) Filed: Sep. 18, 2018

(65) Prior Publication Data
US 2019/0102142 A1    Apr. 4, 2019

(30) Foreign Application Priority Data
Oct. 3, 2017    (EP) .................................... 17194651

(51) Int. Cl.
*G06F 3/16* (2006.01)
*H04R 25/00* (2006.01)
(Continued)

(52) U.S. Cl.
CPC .............. *G06F 3/165* (2013.01); *G06N 20/00* (2019.01); *G10L 25/78* (2013.01); *H04R 25/402* (2013.01); *H04R 25/70* (2013.01)

(58) Field of Classification Search
CPC .... H04R 25/00; H04R 25/55; H04R 2225/00; H04R 25/31; H04R 2225/41; H04R 2225/55
See application file for complete search history.

(56) References Cited

U.S. PATENT DOCUMENTS

2004/0234090 A1    11/2004 Berg
2011/0176697 A1*   7/2011 Apfel ................... H04R 25/305
                                                       381/314
(Continued)

FOREIGN PATENT DOCUMENTS

EP           3 082 350 A1    10/2016

OTHER PUBLICATIONS

Extended European Search Report dated Apr. 5, 2018 for corresponding EP Patent Application No. 17194651.0.
(Continued)

*Primary Examiner* — Hugo Molina
(74) *Attorney, Agent, or Firm* — Vista IP Law Group, LLP

(57) ABSTRACT

An electronic device includes: a communication interface configured to communicate with a hearing device, the hearing device configured to be worn by a user, the hearing device comprising a processing unit configured to receive an input signal and provide an output signal for compensating a hearing loss of the user; a processing unit configured to generate a request upon a detection of the output signal being unsatisfactory, wherein the processing unit is also configured to receive a wireless response that is generated in response to the request, the response being based at least in part on one or more of a plurality of initial fitting parameters of the hearing device, audiogram(s), one or more of a plurality of current settings of the hearing device, or any combination of the foregoing; and a screen configured to display information regarding an adjustment for improving a performance of the hearing device.

21 Claims, 14 Drawing Sheets

(51) Int. Cl.
*G10L 25/78* (2013.01)
*G06N 20/00* (2019.01)

(56) References Cited

U.S. PATENT DOCUMENTS

| | | | |
|---|---|---|---|
| 2013/0177188 A1* | 7/2013 | Apfel | H04R 25/558 |
| | | | 381/315 |
| 2014/0146974 A1* | 5/2014 | Krueger | H04R 25/30 |
| | | | 381/60 |
| 2014/0211972 A1 | 7/2014 | Kim et al. | |
| 2014/0233774 A1* | 8/2014 | Kim | H04R 25/554 |
| | | | 381/315 |
| 2016/0174001 A1* | 6/2016 | Ungstrup | H04R 25/554 |
| | | | 381/315 |
| 2016/0309267 A1* | 10/2016 | Fitz | H04R 25/558 |
| 2016/0373869 A1* | 12/2016 | Gran | H04R 25/407 |
| 2017/0289704 A1* | 10/2017 | Frederiksen | A61B 5/6817 |

OTHER PUBLICATIONS

Communication Pursuant to Article 94(3) dated Nov. 5, 2011 for corresponding EP Patent Application No. 17194651.0.

* cited by examiner

DEFINE YOUR PROBLEM

Please check the problem(s) you are experiencing. Add your own description on the last page.

○ Too loud
○ Too soft
○ Muffled, unclear
○ Extra noise, whistling, static
○ Too sharp, tinny, or shrill
○ The sound fluctuates or cuts in and out
○ Other ⊘ Previous         Next ⊘

BEFORE WE BEGIN

To check if we can help you with this service, please tell us if you're experiencing any of the following:

|  | Yes | No |
|---|---|---|
| Has your hearing changed? | ○ | ⦿ |
| Is your hearing aid broken or clogged with wax/debris? | ○ | ⦿ |
| Is there a problem with the fit of the hearing aids in your ears? | ○ | ⦿ |

48, 4

⊘ Previous         Next ⊘

Fig. 8 (continued)

DEFINE YOUR PROBLEM

Please check the problem(s) you are experiencing. Add your own description on the last page.

○ Too loud
○ Too soft
○ Muffled, unclear
● Extra noise, whistling, static
● Too sharp, tinny, or shrill
○ The sound fluctuates or cuts in and out
○ Other ◁ Previous          Next ▷

WHEN IS IT OCCURRING?

Please check when the problem occurs. Add your own description on the last page.

○ In certain environments
○ With specific sounds
○ All the time

◁ Previous          Next ▷

SYSTEM FOR PROCESSING SERVICE REQUESTS RELATING TO UNSATISFACTORY PERFORMANCE OF HEARING DEVICES, AND COMPONENTS OF SUCH SYSTEM

RELATED APPLICATION DATA

This application claims priority to, and the benefit of, European Patent Application No. EP 17194651.0 filed on Oct. 3, 2017, pending. The entire disclosure of the above application is expressly incorporated by reference herein.

FIELD

The present disclosure relates to a system for processing a service request regarding an unsatisfactory output signal in a hearing device. The system comprising a hearing device configured to be worn by a user, the hearing device comprising a processing unit configured to receive an input signal and provide a processed output signal for compensating a hearing loss of a user. The system comprising an electronic device configured to communicate with the hearing device.

BACKGROUND

Hearing impaired users wear hearing devices to be able to hear. The hearing device settings are flexible, comprehensive and complex and good settings are highly personalized and may be hard to achieve. The settings are identified during a fitting session where a Hearing care professional (HCP) adjusts the hearing device to the liking of the user. Good settings are desired as less than optimal settings may result in poor performance from the hearing device and subsequently a bad experience for the user.

The Hearing care professional needs to be good at adjusting hearing devices to create good experiences for the users. This presents a challenge to the Hearing care professional because of the complexity of the adjustment handled in the hearing device and due to the user's perception of the fitting changing over time as the user becomes accustomed to the hearing device. Typically, several follow-up meetings are required to fine-tune the settings and this is time-consuming to both the user and the Hearing care professional.

There is a need for an improved system and method for adjusting and fine-tuning settings in hearing devices.

SUMMARY

Disclosed is a system for processing a service request regarding an unsatisfactory output signal in a hearing device. The system comprises a hearing device configured to be worn by a user, the hearing device comprising a processing unit configured to receive an input signal and provide a processed output signal for compensating a hearing loss of a user. The system comprises an electronic device configured to communicate with the hearing device. The system comprises a server configured for communicating with the electronic device. The server comprises one or more of: a plurality of initial fitting parameters of the hearing device, a plurality of audiograms of the user, and/or a plurality of current settings of the hearing device. The system comprises a computing program comprised by or connected to the server. The electronic device is configured to transmit a service request to the server upon a detection of an unsatisfactory processed output signal. The server is configured to transmit the service request and one or more of the initial fitting parameters of the hearing device, audiograms, and/or current settings of the hearing device, to the computing program. The computing program is configured to process the service request and provide a response to the service request based at least in part on at least one of the initial fitting parameters of the hearing device, audiograms, and/or current settings of the hearing device. The computing program is configured to transmit the response to the hearing device via the server and via the electronic device.

Disclosed is a method in a system for processing a service request regarding an unsatisfactory output signal in a hearing device. The system comprises a hearing device configured to be worn by a user, the hearing device comprising a processing unit configured to receive an input signal and provide a processed output signal for compensating a hearing loss of a user. The system comprises an electronic device configured to communicate with the hearing device. The system comprises a server configured for communicating with the electronic device, wherein the server comprises one or more of: a plurality of initial fitting parameters of the hearing device, a plurality of audiograms of the user, and/or a plurality of current settings of the hearing device. The system comprises a computing program comprised by or connected to the server. The method comprises transmitting a service request from an electronic device to a server upon a detection of an unsatisfactory processed output signal in the hearing device. The method comprises transmitting, from the server, the service request and one or more of the initial fitting parameters of the hearing device, audiograms, and/or current settings of the hearing device, to the computing program. The method comprises processing the service request in a computing program. The method comprises providing a response to the service request based at least in part on at least one of the initial fitting parameters of the hearing device, audiograms, and/or current settings of the hearing device. The method comprises transmitting the response from the computing program to the hearing device via the server and via the electronic device.

Disclosed is an application to be executed by an electronic device, where the electronic device is configured to communicate with a hearing device, the hearing device is configured to be worn by a user, the hearing device comprising a processing unit configured to receive an input signal and provide a processed output signal for compensating a hearing loss of a user; the application is configured for:

transmitting a service request from the electronic device to a computing program via a server upon a detection of an unsatisfactory processed output signal in the hearing device;

receiving, in the electronic device, a response, from the computing program via the server, to the service request based at least in part on at least one of a plurality of initial fitting parameters of the hearing device, a plurality of audiograms of the user, and/or a plurality of current settings of the hearing device;

receiving, in the electronic device, a feedback from the user regarding whether the response to the service request comprising a suggestion for a fine-tuning of the initial fitting parameters of the hearing device and/or of the current settings of the hearing device provides a satisfactory output signal in the current sound environment; and transmitting the feedback from the electronic device to the server and/or to the computing program via the server.

The system, method and application as disclosed provides the advantage that the computing program processes the service request from the user of the hearing device, and the computing program provides a response to the service request. The response to the service request is based at least in part on at least one of the initial fitting parameters of the hearing device, audiograms, and/or current settings of the hearing device.

Thus it is an advantage that the user may receive instant, immediate or real-time response to his/her service request, whereby the user can receive a fine-tuning package to fine-tune the hearing device immediately after the unsatisfactory output signal occurs.

This way the user may experience to get immediate resolutions to his/her non-optimal hearing device settings in the situation as the unsatisfactory output signal occurs.

The hearing device comprises a processing unit configured to receive an input signal and provide a processed output signal for compensating a hearing loss of a user, for example the hearing loss may be in certain frequency ranges.

The system comprises an electronic device configured to communicate with the hearing device. The electronic device may be the hearing device user's smart phone, tablet or pc. The electronic device may communicate with the hearing device for example via Bluetooth (BT) or other wired or wireless communication technology standards for exchanging data over short distances.

The system comprises a server configured for communicating with the electronic device. The server may be a cloud server. The server may be the "GN Hearing Internet Services". The server may comprise a computer program or a device that provides functionality for other programs or devices, called "clients", e.g. the electronic device of the hearing device user and other electronic devices of other hearing device users. Thus the server can serve multiple electronic devices and/or hearing devices. The servers may provide various functionalities, called "services", such as storing data of the electronic devices and/or of the hearing devices, and/or performing computation for the electronic devices and/or for the hearing devices. The server may be a database server, a file server, and/or an application server.

The server comprises one or more of: a plurality of initial fitting parameters of the hearing device, a plurality of audiograms of the user, and/or a plurality of current settings of the hearing device.

The initial fitting parameters of the hearing device are those parameters of the hearing device that may be determined by a Hearing care professional at the user's visit or consultation at the Hearing care professional. The initial fitting parameters may for example regard frequencies, noise reduction, enhanced speech, directionality, focus beams, level etc.

The plurality of current settings of the hearing device, or the current setting of the hearing device may be a setting or settings which the user has made herself/himself, for example increased or reduced the volume of the speaker of the hearing device, increased or reduced the noise reduction, increased or reduced the gain, the level etc. These current settings may be deleted if the hearing device is switched off for example when batteries are exchanged.

There may be a plurality of audiograms for the user, or one or more audiograms of the user. An audiogram is a graph that may show the audible threshold for standardized frequencies as measured by an audiometer. The Y axis may represent intensity measured in decibels and the X axis may represent frequency measured in hertz. The threshold of hearing may be plotted relative to a standardised curve that represents 'normal' hearing, in dB(HL). Audiograms may be set out with frequency in hertz (Hz) on the horizontal axis, most commonly on a logarithmic scale, and a linear dBHL scale on the vertical axis. For humans, normal hearing is between −10 dB(HL) and 15 dB(HL), although 0 dB from 250 Hz to 8 kHz is deemed to be 'average' normal hearing. Ideally the audiogram would show a straight line, but in practice everyone is slightly different, and small variations are considered normal. Larger variations, especially below the norm, may indicate hearing impairment which occurs to some extent with increasing age, but may be exacerbated by prolonged exposure to fairly high noise levels such as by living close to an airport or busy road, work related exposure to high noise, or brief exposure to very high sound levels such as gunshot or music in either a loud band or clubs and pubs. Hearing impairment may also be the result of certain diseases.

Additionally and/or alternatively to audiograms of the user, the server may comprise other characteristics of the user, such as age of the user and/or gender of the user.

The server may further comprise any feedback received from the hearing device users regarding the requested and received fine tunings, i.e. whether the suggested fine-tuning solved the problem of the unsatisfactory processed output signal.

The system comprises a computing program comprised by or connected to the server. Thus the computing program may be comprised by the server, such as incorporated in the server. The computing program may be connected to the server, such as being separate from the server. The computing program may be configured to apply a machine learning method to the data comprising service requests, responses to the service requests and/or feedback from a plurality of hearing device users.

The electronic device is configured to transmit a service request to the server upon a detection of an unsatisfactory processed output signal. The server is configured to transmit the service request and one or more of the initial fitting parameters of the hearing device, audiograms, and/or current settings of the hearing device, to the computing program.

The computing program is configured to process the service request and provide a response to the service request based at least in part on at least one of the initial fitting parameters of the hearing device, audiograms, and/or current settings of the hearing device. The computing program is configured to transmit the response to the hearing device via the server and via the electronic device. The computing program is configured to transmit the response to the electronic device via the server.

Thereby the response from the computing program may be received in the electronic device, and the user may then select, in the electronic device, to accept a suggested fine-tuning in the response. Thus the response from the computing program may comprise a fine-tuning solution to the hearing device. The response may alternatively comprise a message or indication or notification that the computing program cannot provide a suggestion for a fine-tuning to solve the problem with the unsatisfactory processed output signal. Alternatively and/or additionally the response may comprise a message or notification that the user should contact his Hearing care professional and/or that the user will be contacted by the Hearing care professional. This may for example be the case, if the computing program determines that the adjustment or tuning of the hearing device required to solve the unsatisfactory processed output signal requires adjustments or tunings which are above a pre-defined threshold.

The system is for processing a service request regarding an unsatisfactory output signal in a hearing device. The service request may be from the user of the hearing device, when the user hears an unsatisfactory output signal in the hearing device. The user may wear a hearing device in the left and/or right ear. Thus the user may wear one or two hearing devices.

The electronic device is configured to transmit a service request to the server upon a detection of an unsatisfactory processed output signal. The service request may be detected and/or initiated by the hearing device user. The service request may be detected and/or initiated by the hearing device itself.

When the service request is requested, the hearing device may not be in an operation mode, function mode or working mode. When the service request is requested, the hearing device may be in a request mode, whereby the hearing device does not provide a processed output signal for compensating a hearing loss of a user.

The computing program is configured to process the service request and to provide a response to the service request. The response may be a suggestion for a fine-tuning of one or more of the plurality of initial fitting parameters of the hearing device, and/or the plurality of current settings of the hearing device. The response may comprise a number of suggestions, for example two suggestions, or three suggestions. The user may then select which one of the number of suggestions that he/she will try first. The selection by the user may be a selection of a suggestion or option displayed in an application on a user interface on the electronic device, e.g. the user's smart phone. When the user has selected one of the suggestions, the selected fine-tuning may then be installed immediately in the hearing device. If the user is still in the same location, situation or environment where the unsatisfactory processed output signal occurred, the user can then immediately test or check whether the response to the service request, e.g. the selected suggested fine-tuning, has solved the unsatisfactory processed output signal. If the issues with the unsatisfactory processed output signal is solved by the selected fine-tuning, the user may not test another one of the number of suggestions for fine-tuning. However, if the issues with the unsatisfactory processed output signal is not solved by the selected fine-tuning, and the user is still in the same location, situation or environment where the unsatisfactory processed output signal occurred, the user may now test another one of the number of suggestions for fine-tuning.

The locations, environments or situations where the unsatisfactory processed output signal occurs may for example be in a noisy environment, e.g. on the street with traffic noise, e.g. at home with a washing machine running, e.g. at a party with many people talking and laughing etc.; or in a place where more people are talking at the same time, e.g. at a dinner table or lunch table; etc.

The fine-tuning of one or more of the plurality of initial fitting parameters of the hearing device, and/or the plurality of current settings of the hearing device may be a fine-tuning of for example frequencies, noise reduction, enhanced speech, directionality, focus beams, level etc.

It is an advantage of the present system that it enables and performs remote fine-tuning of hearing device setting.

Furthermore it is an advantage that the system may generate new data for machine learning. This may be achieved by defining updates based on validation of the relevance and feasibility of providing in situ fine tunings with associated feedback from the users. Furthermore, this may be achieved by applying machine learning to data related to in situ remote fine tunings as they will be gathered.

In the prior art, the hearing device user and the Hearing care professional may interact across distance and time using a system enabling them to communicate via the Internet. The user can send a request for service to the Hearing care professional, and the Hearing care professional is able to send a set of updated settings created in the fitting software (FSW) to the user's hearing device via an application (App) on the user's smart phone, tablet, and/or pc etc.

It is an advantage of the present system that it provides for instant user-driven fine tuning to be achieved by the use of a computing program, such as using machine learning system, e.g. using cognitive computing, where the user is directly connected with the computing program. Thus the Hearing care professional is not contacted in a first instance, where the computing program can find a solution to the user request. Only if the computing program cannot find a suitable solution to the user request, the Hearing care professional may be contacted. Thus the Hearing care professional may only have to spend time on complicated problems. For easier problems, the computing program may be able to find a satisfactory solution without involving the Hearing care professional.

The basis of instant fine tuning may be the combination of one or more of:
  Current hearing device fitting;
  Current settings in hearing device (as applied via the App);
  User audiogram(s);
  Sound bite or sound scape from user's current environment.

To ascertain continuous improvement and/or learning, the system may provide for that the user efficiently and accurately can provide feedback to the system about to which extent the problem has been solved.

Compared to the prior art, the user may now receive instant remote fine tuning to overcome listening challenges in the situation as it occurs.

Updated hearing device settings may be provided by the computing program, and possibility reviewed by audiologists to thereby, over time through the feedback provided by the users, improve the quality of the fine tunings provided.

It is an advantage that the present system can apply machine learning to data gathered via features in the system.

Data related to requests for in situ remote fine tunings, actual fine tuning packages and feedback on the provided fine tuning packages may be accumulated. That data may be the basis for machine learning as well as for design of the system, which in the longer run automatically can compile and provide the optimal remote fine tuning package.

The benefit for the user is faster and better fine tuning by the present system. It is faster as the user gets instant response to their service request and the quality of the fine tuning packages may be better overall as the trained system is assumed to outperform the human Hearing care professional in diagnosis and suggested treatment over time. The instant response without the involvement of a Hearing care professional will also give the user a sense of empowerment, which is of high importance to many hearing device users.

The Hearing care professional benefits from using less time on simple fine tuning tasks without providing less service to the user.

In some embodiments the service request comprises a representation of sound from the location of the user.

The representation of sound may be a soundbite and/or a soundscape. The representation of sound may be from an audio recording performed by the electronic device and/or by the hearing device. Thus the representation of sound may be recorded by the electronic device, e.g. using a microphone of the user's smart phone. Alternative and/or additionally the representation of sound may be recorded by the hearing device, e.g. using a microphone of the user's hearing device.

A soundbite may be a short sound representation, e.g. a few milliseconds, a few seconds etc. A sound scape may be a processed or transformed version of a soundbite. A sound bite may comprise personal information of the hearing device user, e.g. as the sound bite may be recorded while the hearing device user is speaking. Thus a sound scape may be provided from the soundbite, thereby removing any potential personal information of the hearing device user. The sound scape may then be transmitted to the server and to the computing program without violating storage of personal data.

The sound may be analysed by e.g. the computing program, whereby the computing program can identify the location to be for example in a train, in a car, at a party, at a music concert, in traffic as pedestrian etc. A number of typical locations may be stored in a database in connection with or comprised in the computing program.

The representation of sound is from the location of the user, i.e. the hearing device user's current location, position, environment, scene, where the unsatisfactory output signal occurs.

Additionally and/or alternatively, the service request may comprise a spoken part, e.g. where the hearing device user explains in speech in which situation the output signal is unsatisfactory, e.g. "there is too much traffic noise on the street so I cannot talk to my spouse", or "it is heard to hear which of my children is speaking when a dog is barking in the background" etc. From the representation of sound, it may be identified that the unsatisfactory processed output signal occurred in a location with traffic noise or a barking dog, however the user explaining the specific listening problem in the situation, e.g. "cannot talk to my spouse" or "heard to hear which of my children is speaking" may facilitate the computing program in identifying the correct or best solution, i.e. fine-tuning, to the unsatisfactory processed output signal.

In some embodiments the representation of sound is recorded by the electronic device.

In some embodiments the response to the service request comprises a suggestion for a fine-tuning of the initial fitting parameters of the hearing device and/or of the current settings of the hearing device. Thus the initial fitting parameters of the hearing device may be fine-tuned, and/or the current settings of the hearing device may be fine-tuned. The initial fitting parameters may be the parameters which the Hearing care professional has set based on the audiogram(s) of the user. The current settings may be those settings which the Hearing care professional and/or the user have set after the initial fitting parameters have been determined.

The suggested fine-tuning may for example be of frequencies, noise reduction, enhanced speech, directionality, focus beams, level etc.

Alternatively, the response to the service request may comprise a notification that no fine-tuning is suggested.

In some embodiments the hearing device is configured to execute the suggested fine-tuning. Thus the computing program may transmit the response comprising the suggested fine-tuning to the electronic device, via the server. The response to the fine-tuning may be a notification in the electronic device, e.g. in a user app on the user's smartphone. The notification may comprise a message like "would you like to install new settings in your hearing device?" The user interface of the electronic device, e.g. in the app, may show a button, e.g. graphic button on the user interface, with the text "Accept". When the user has accepted this installation of new settings, then the suggested fine-tuning is installed, and the hearing device can then execute the suggested fine-tuning.

In some embodiments the unsatisfactory output signal is caused by a current sound environment. The current sound environment or location where the unsatisfactory processed output signal occurs may for example be in a noisy environment, e.g. on the street with traffic noise, e.g. at home with a washing machine running, e.g. at a party with many people talking and laughing etc.; or in a place where more people are talking at the same time, e.g. at a dinner table or lunch table; etc. The current sound environment may be the reason why the output signal is unsatisfactory, e.g. due to noise in the current sound environment which could not or was not tested in the initial fitting session at the Hearing care professional, e.g. because the noise is specific for the hearing device user's environment, e.g. a certain type of noise from machines, animals etc.

In some embodiments a feedback from the user regarding whether the fine-tuning provides a satisfactory output signal in the current sound environment is provided to the computing program. Thus the user may evaluate whether the fine-tuning solved the listening problem, and provide this evaluation as feedback to the system. The user may for example fill out a questionnaire on the electronic device answering questions regarding whether the fine-tuning provided a satisfactory output signal in the current sound environment. This feedback is then transmitted back to the computing program via the server. If the computing program is configured to apply a machine learning method for providing suggested fine-tunings, the feedback may be provided to the machine learning method thereby improving the future suggested fine-tunings.

In some embodiments the server comprises data comprising service requests, responses to the service requests and/or feedback from a plurality of hearing device users. Thus the server may comprise data storage. The data may relate to which service requests have been received from a plurality of hearing device users. The data may relate to which responses to the service requests that have been provided to a plurality of users from the computing program. The data may relate to which feedback from a plurality of hearing device users that have been received. The feedback may regard whether a user feels that the suggested fine-tuning provides a satisfactory output signal in the current sound environment.

In some embodiments the computing program is configured to apply a machine learning method to the data comprising service requests, responses to the service requests and/or feedback from a plurality of hearing device users. Thus the computing program is configured to apply a machine learning method to the data of the system. The data of the system may comprise one or more of service requests from a plurality of user, and/or responses to the service requests to the users from the computing program, and/or feedback from a plurality of hearing device users regarding whether the fine-tuning provides a satisfactory output signal in the current sound environment.

The machine learning method may comprise construction of algorithms that can learn from and make predictions and decisions based on the data of the system, i.e. the service requests, the responses to the service requests and/or the feedback from the users. The machine learning may be employed in a range of computing tasks relating to the data of the system. Thus the machine learning method may provide the response to the service requests, i.e. the machine learning method may provide the suggested fine-tuning. This suggested fine-tuning may be based on the data received, e.g. data where the user describes the listening problem, e.g. too much noise, data of the sound environment, e.g. a sound bite or sound scape etc. Further, the machine learning method may compare the suggested fine-tuning with feedback from the user regarding whether or to which extent the unsatisfactory output signal was improved by the suggested fine-tuning. Based on this, the machine learning method may adjust or improve its algorithms for calculating the suggested fine-tuning.

The machine learning tasks, e.g. provide a suggested fine-tuning, may be classified into three broad categories, depending on the nature of the learning "signal" or "feedback" available to a learning system. These categories may be:

Supervised learning: The computer is presented with example inputs and their desired outputs, given by a "teacher", and the goal is to learn a general rule that maps inputs to outputs.

Unsupervised learning: No labels are given to the learning algorithm, leaving it on its own to find structure in its input. Unsupervised learning can be a goal in itself (discovering hidden patterns in data) or a means towards an end (feature learning).

Reinforcement learning: A computer program interacts with a dynamic environment in which it must perform a certain goal, such as determining a suggested fine-tuning of the hearing device to solve the unsatisfactory output signal. The program is provided feedback in terms of user evaluation on the effect of the suggested fine-tuning in the current sound environment, as it navigates its problem space.

Another categorization of machine learning tasks arises when one considers the desired output of a machine-learned system:

In classification, inputs are divided into two or more classes, and the learner must produce a model that assigns unseen inputs to one or more (multi-label classification) of these classes. This is typically tackled in a supervised way. Filtering of types of requests is an example of classification, where the inputs are requests and the classes are for example "fine-tuning of noise suppression" and "fine-tuning of directionality".

In regression, also a supervised problem, the outputs are continuous rather than discrete.

In clustering, a set of inputs is to be divided into groups. Unlike in classification, the groups are not known beforehand, making this typically an unsupervised task.

Density estimation finds the distribution of inputs in some space.

Dimensionality reduction simplifies inputs by mapping them into a lower-dimensional space. Topic modeling is a related problem, where a program is given audio files of representations of sound environments and is tasked to find out which audio files cover similar sound environments.

In some embodiments the computing program is configured to provide the response to the service request at least in part based on the machine learning method. Thus the machine learning method may be used to define the type of problem and/or may be used to determine possible solutions to the defined problem.

In some embodiments providing the response to the service request comprises determining a cause of the unsatisfactory output signal and determining the suggested fine-tuning of the initial fitting parameters of the hearing device and/or of the current settings of the hearing device. Determining a cause of the unsatisfactory output signal may e.g. be to determine that the unsatisfactory output signal occurs when there is a lot of noise in the sound environment. Determining the suggested fine-tuning may e.g. be that the noise suppression should be increased in sound environments with a lot of noise.

In some embodiments the transmission of the service request is user-initiated and/or initiated by the hearing device. The service request may be detected and/or initiated by the hearing device user. If the user finds that the processed output signal is unsatisfactory, the user may herself/himself initiate and/or transmit the service request to the system, e.g. by entering the listening problem in an app on the electronic device, such as filling out a questionnaire regarding when the unsatisfactory output signal occurs, e.g. when listening to music, and what the problem relates to, e.g. experience too much noise etc.

Alternatively and/or additionally, the service request may be detected and/or initiated by the hearing device itself. For example if the hearing device detects an unsatisfactory output signal, e.g. the hearing device detects too much noise, when the haring device user listens to music, then the hearing device can initiate the service request. The user may be given the option to accept or reject that the hearing device proposed service request is transmitted to the system.

In some embodiments the service request comprises input from the user in the form of user speech and/or entered user input in text-form. User input in text-form may be the user filling out a questionnaire regarding when the problem occurs, e.g. when listening to music, and what the problem relates to, e.g. too much noise. The user input in text-form may be provided in an app on the electronic device, e.g. in a graphical user interface, where the electronic device is a touch-screen device such that the user can provide his/her input by providing gestures, e.g. taps, on the user interface, to select his/her answers in a questionnaire with predefined options for input.

Alternatively and/or additionally, the input may comprise user speech, e.g. the user may describe the problem and in which circumstances it occurs in words, i.e. orally, to e.g. a speech recognition system, which then handles the speech-to-text processing, and transmits the input in processed text form to the computing program. The electronic device may comprise a microphone for recording of the user speech.

Alternatively and/or additionally as described above, the electronic device may comprise a microphone for recording of the sound environment to obtain a representation of sound from the location of the user, e.g. a soundbite or soundscape.

In some embodiments the response to the service request comprises a notification that no fine-tuning is suggested. Thus, if the computing program cannot find a solution, such as a suitable or acceptable solution, e.g. a fine-tuning within a predefined threshold, then the response to the service request may be that no fine-tuning is suggested. Such notification may be accompanied with an invitation to contact the Hearing care professional, or with a notification that the Hearing care professional will contact the user. However, if a suitable or acceptable solution is found, then the response to the service request comprises a suggestion for a fine-tuning of the initial fitting parameters of the hearing device and/or of the current settings of the hearing device.

In some embodiments when no fine-tuning is suggested, the user is recommended to contact a hearing care professional and/or a hearing care professional is instructed to contact the user.

The present embodiments relate to different aspects including the system described above and in the following, and corresponding applications, system parts, methods, devices, networks, kits, uses and/or product means, each yielding one or more of the benefits and advantages described in connection with the first mentioned aspect, and each having one or more embodiments corresponding to the embodiments described in connection with the first mentioned aspect and/or disclosed in the appended claims.

A system for improving a performance of a hearing device, the hearing device configured to be worn by a user, the hearing device comprising a processing unit configured to receive an input signal and provide an output signal for compensating a hearing loss of the user, includes; a database comprising one or more of: a plurality of initial fitting parameters of the hearing device, audiogram(s), a plurality of current settings of the hearing device, or any combination of the foregoing; a communication interface configured to receive a request regarding the hearing device, the request being based upon a detection of the output signal from the processing unit of the hearing device being unsatisfactory; and a response generator configured to process the request and generate a response based at least in part on one or more of the initial fitting parameters of the hearing device, the audiogram(s), one or more of the current settings of the hearing device, or any combination of the foregoing, wherein the system is configured to output the response for wireless transmission, and wherein the response comprises information regarding an adjustment for improving a performance of the hearing device.

Optionally, the request comprises a representation of sound from a location of the user.

Optionally, the representation of the sound is recorded by an electronic device that is different from the hearing device.

Optionally, the response comprises a suggestion for adjustment of at least one of the initial fitting parameters of the hearing device and/or of at least one of the current settings of the hearing device.

Optionally, the system further includes the hearing device, wherein the hearing device is configured to execute the adjustment.

Optionally, the unsatisfactory output signal is caused by a current sound environment.

Optionally, the response is configured to cause an adjustment of at least one of the initial fitting parameters of the hearing device and/or at least one of the current settings of the hearing device.

Optionally, the system further includes a feedback processing unit configured to receive a feedback from the user regarding whether the adjustment provides a satisfactory output signal in a current sound environment.

Optionally, the database comprises multiple requests, multiple responses to the multiple requests respectively, feedback from multiple hearing device users, or any combination of the foregoing; wherein the multiple requests include the request received by the communication interface, the multiple responses include the response generated by the response generator, and the multiple hearing device users include the user of the hearing device.

Optionally, the response generator is configured to perform machine learning based on multiple requests, multiple responses to the multiple requests respectively, feedback from multiple hearing device users, or any combination of the foregoing; wherein the multiple requests include the request received by the communication interface, the multiple responses include the response generated by the response generator, and the multiple hearing device users include the user of the hearing device.

Optionally, the response generator is configured to provide the response based at least in part on machine learning.

Optionally, the response generator is configured to: determine a cause of the unsatisfactory output signal, and determine a recommendation for adjusting the one or more of the initial fitting parameters of the hearing device and/or the one or more of the current settings of the hearing device.

Optionally, the request is user-initiated or initiated by the hearing device.

Optionally, the request comprises an input from the user, the input being in a form of speech and/or text.

Optionally, the response comprises a recommendation for adjusting a frequency, a noise reduction, an enhanced speech, a directionality, a focus beam, a sound level, or any combination of the foregoing.

Optionally, the response indicates that no adjustment for improving the performance of the hearing device is needed.

Optionally, the system is configured to output the response for reception by an electronic device.

Optionally, the electronic device is configured to communicate with the hearing aid.

Optionally, the system further includes the electronic device.

An electronic device includes: a communication interface configured to communicate with a hearing device, the hearing device configured to be worn by a user, the hearing device comprising a processing unit configured to receive an input signal and provide an output signal for compensating a hearing loss of the user; a processing unit configured to generate a request upon a detection of the output signal in the hearing device being unsatisfactory, wherein the processing unit is also configured to receive a wireless response that is generated in response to the request, the response being based at least in part on one or more of a plurality of initial fitting parameters of the hearing device, audiogram(s), one or more of a plurality of current settings of the hearing device, or any combination of the foregoing; and a screen configured to display information regarding an adjustment for improving a performance of the hearing device.

A product includes a set of instructions, an execution of which by an electronic device will cause a process to be performed, wherein the electronic device is configured to communicate with a hearing device, the hearing device configured to be worn by a user, the hearing device comprising a processing unit configured to receive an input signal and provide an output signal for compensating a hearing loss of the user, the process comprising: transmitting a request from the electronic device upon a detection of the output signal in the hearing device being unsatisfactory; receiving, in the electronic device, a response from a server, wherein the response is based at least in part on one or more of a plurality of initial fitting parameters of the hearing device, audiogram(s), one or more of a plurality of current settings of the hearing device, or any combination of the foregoing; receiving, in the electronic device, a feedback from the user regarding whether an adjustment of at least one of the initial fitting parameters of the hearing device and/or of at least one of the current settings of the hearing device, based on the response provides a satisfactory output signal; and transmitting the feedback from the electronic device to the server.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
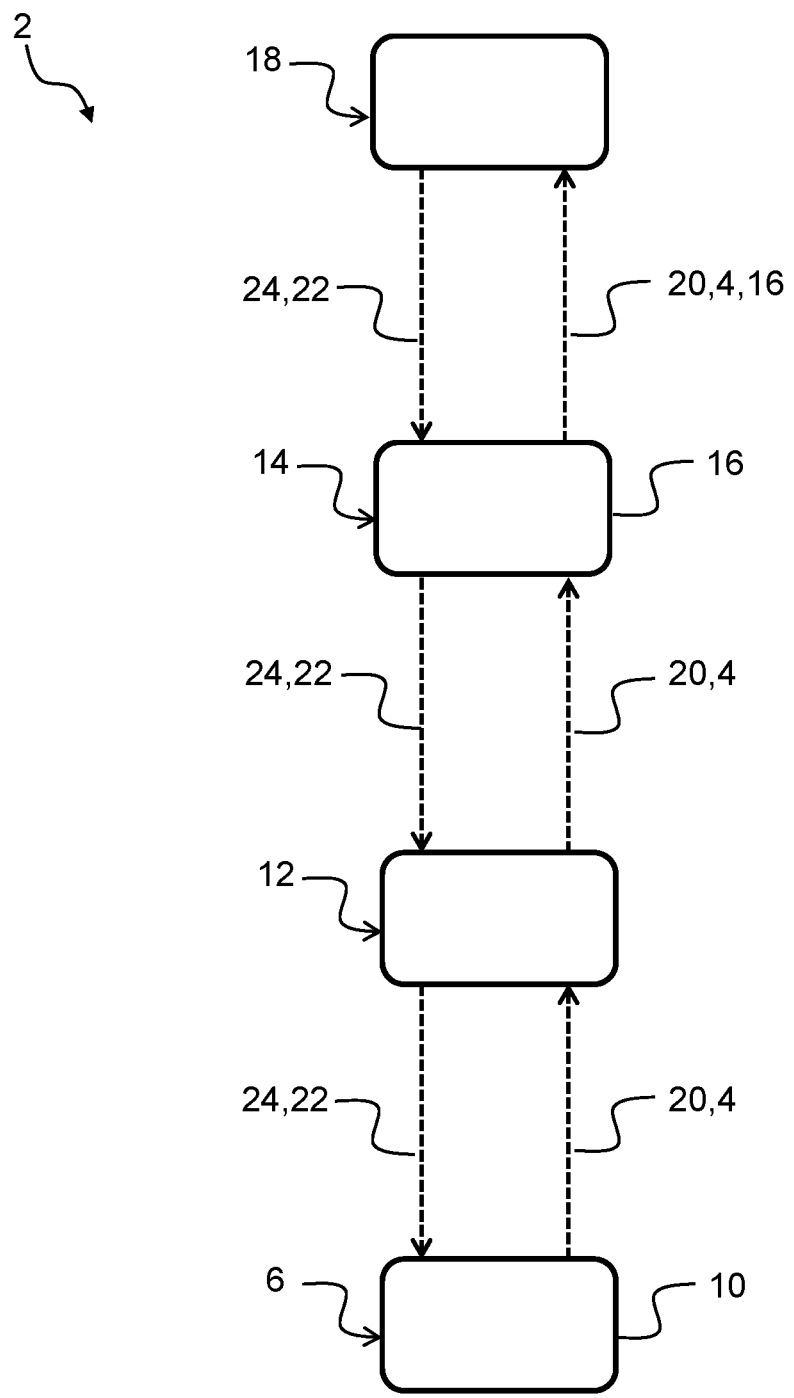
FIG. 1 schematically illustrates an example of a system for processing a service request regarding an unsatisfactory output signal in a hearing device.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

FIG. 1 schematically illustrates an example of a system 2 for processing a service request 4 regarding an unsatisfactory output signal in a hearing device 6. The system 2 comprises a hearing device 6 configured to be worn by a user (not shown), the hearing device 6 comprising a processing unit 10 configured to receive an input signal and provide a processed output signal for compensating a hearing loss of the user. The system 2 comprises an electronic device 12 configured to communicate with the hearing device 6. The system 2 comprises a server 14 configured for communicating with the electronic device 12. The server 14 comprises one or more of: a plurality of initial fitting parameters 16 of the hearing device, a plurality of audiograms 16 of the user, and/or a plurality of current settings 16 of the hearing device. The system 2 comprises a computing program 18 comprised by or connected to the server 14. The electronic device 12 is configured to transmit a service request 4 to the server 14 upon a detection of an unsatisfactory processed output signal. The server 14 is configured to transmit 20 the service request 4 and one or more of the initial fitting parameters 16 of the hearing device 6, audiograms 16, and/or current settings 16 of the hearing device 6, to the computing program 18. The computing program 18 is configured to process the service request 4 and provide a response 22 to the service request 4 based at least in part on at least one of the initial fitting parameters 16 of the hearing device 6, audiograms 16, and/or current settings 16 of the hearing device 6. The computing program 18 is configured to transmit 24 the response 22 to the hearing device 6 via the server 14 and via the electronic device 12.

Figure 2:
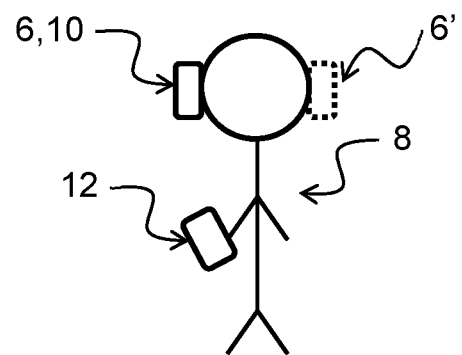
FIG. 2 schematically illustrates an example of a user wearing a hearing device with a processing unit.

FIG. 2 schematically illustrates an example of a user 8 wearing a hearing device 6 with a processing unit 10. The user 8 may also wear another hearing device 6', e.g. a second hearing device, such as in the other ear. An electronic device 12 is configured to communicate with the hearing device 6. The electronic device 12 may be the user's smart phone, tablet or pc having installed an application thereon for managing service requests (see FIG. 1).

Figure 3:
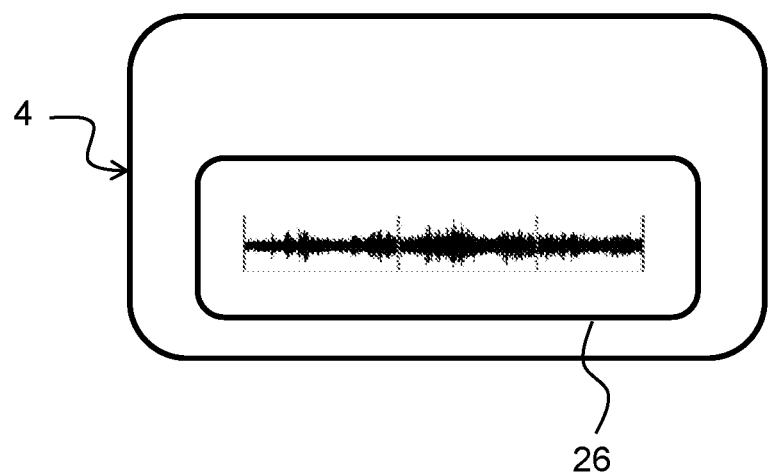
FIG. 3 schematically illustrates an example of a service request comprising a representation of sound from the location of the user.

FIG. 3 schematically illustrates an example of a service request 4 comprising a representation 26 of sound from the location of the user. The representation 26 of sound may comprise a sound bite and/or a sound scape. The service request 4 may comprise more than the representation 28, for example the service request 4 may comprise input from the user in text-form inputted in a user interface, such as filling out a questionnaire, and/or speech input from the user. The service request 4 may additionally and/or alternatively comprise input or data from the hearing device and/or from the electronic device.

Figure 4:
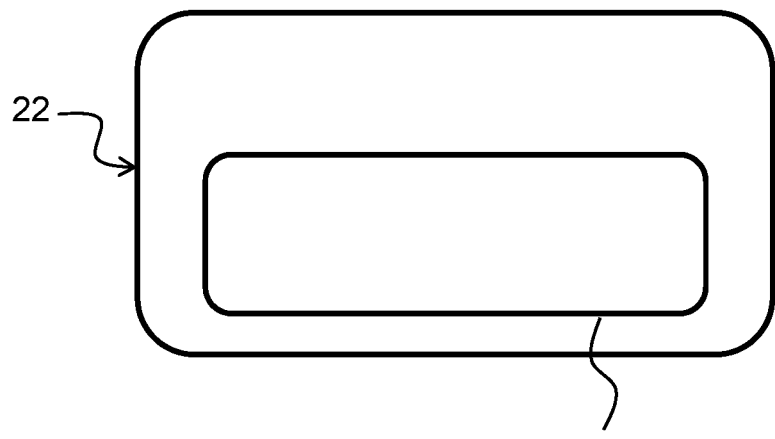
FIG. 4 schematically illustrates an example of a response to the service request, the response comprising a suggestion for a fine-tuning of the initial fitting parameters of the hearing device, and/or of the audiograms, and/or of the current settings of the hearing device.

FIG. 4 schematically illustrates an example of a response 22 to the service request, the response comprising a suggestion 28 for a fine-tuning of the initial fitting parameters of the hearing device, and/or of the audiograms, and/or of the current settings of the hearing device. The response 22 may be received on the electronic device, and the user may accept to install the suggestion 28 for a fine-tuning.

Figure 5:
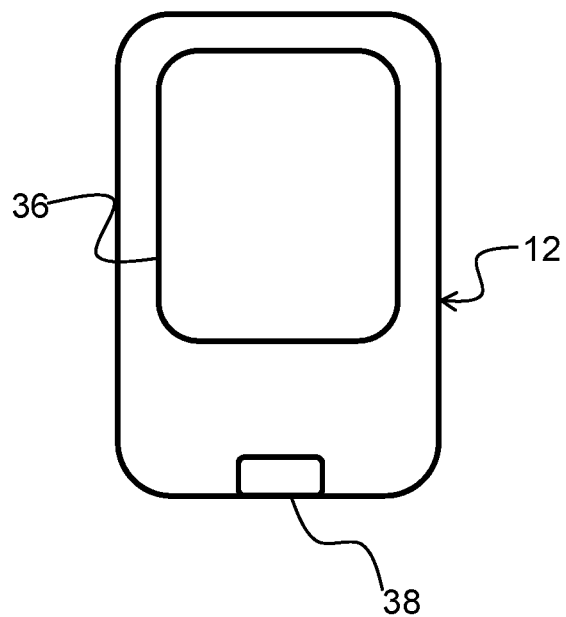
FIG. 5 schematically illustrates an electronic device for communicating with the hearing device and with the server.

FIG. 5 schematically illustrates an electronic device 12 for communicating with the hearing device and with the server. The electronic device 12 comprises a touch sensitive screen 36 for receiving user input. The electronic device 12 comprises a microphone 38 for recording a representation of sound, e.g. a sound bite or sound scape, and/or for recording user speech.

Figure 6:
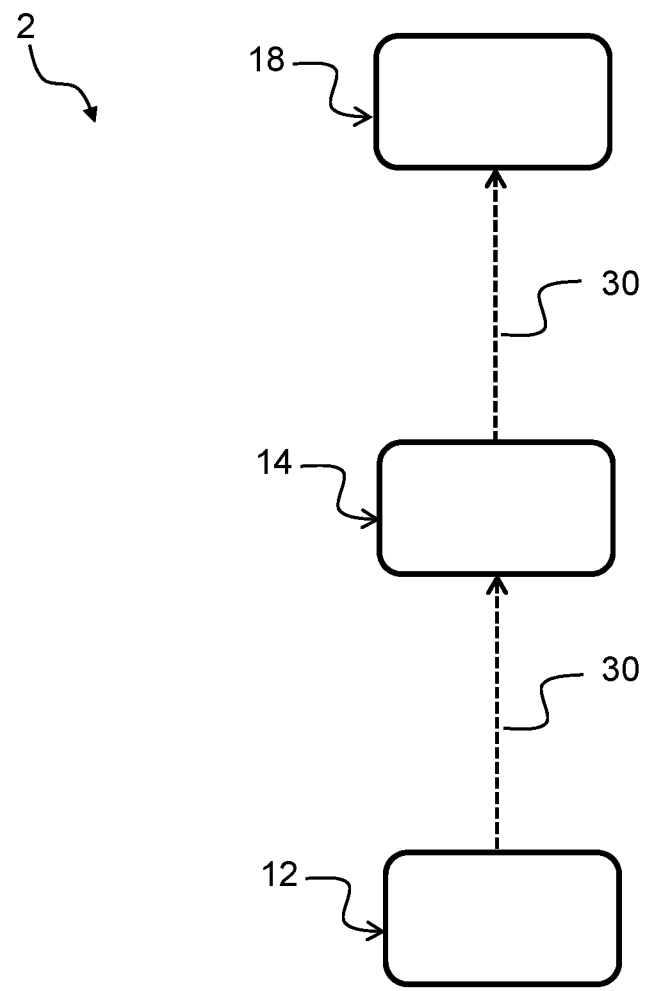
FIG. 6 schematically illustrates transmission of feedback from the user regarding whether the suggested fine-tuning provides a satisfactory output signal in the current sound environment.

FIG. 6 schematically illustrates transmission of feedback 30 from the user regarding whether the suggested fine-tuning provides a satisfactory output signal in the current sound environment. The feedback 30 may be inputted by the user on the electronic device 12, then transmitted to the computing program 18 via the server 14.

Figure 7:
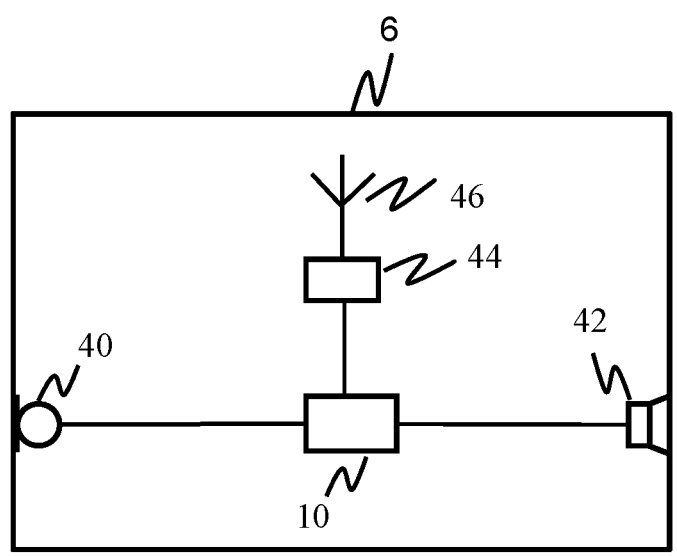
FIG. 7 schematically illustrates an example of a hearing device.

FIG. 7 schematically illustrates an example of a hearing device 6. The hearing device 6 comprises an input transducer 40, such as microphone, for receiving an audio input signal. The input signal is provided to a processing unit 10 which is configured to provide a processed output signal for compensating a hearing loss of the user. The processed output signal is provided to an output transducer 42, e.g. a speaker, in the hearing device 6. The hearing device 6 comprises a transceiver 44 connected to an antenna 46 for wireless communicating with the electronic device, e.g. the user's smartphone, tablet or pc, for example via Bluetooth.

Figure 8:
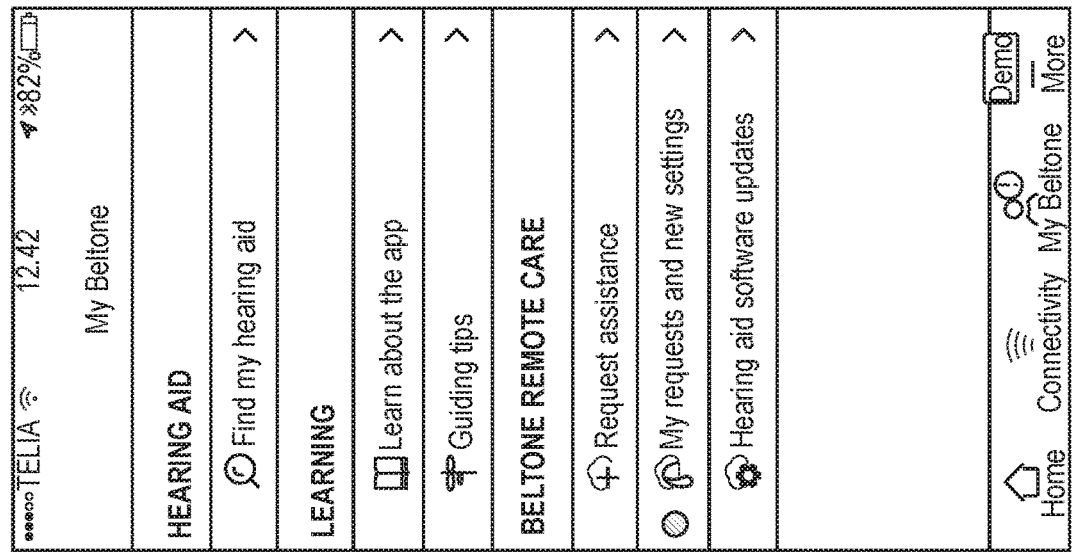
FIG. 8 schematically illustrates an example of user interfaces of an application for a user to transmit a service request regarding an unsatisfactory output signal in the user's hearing device.
Figure 8:
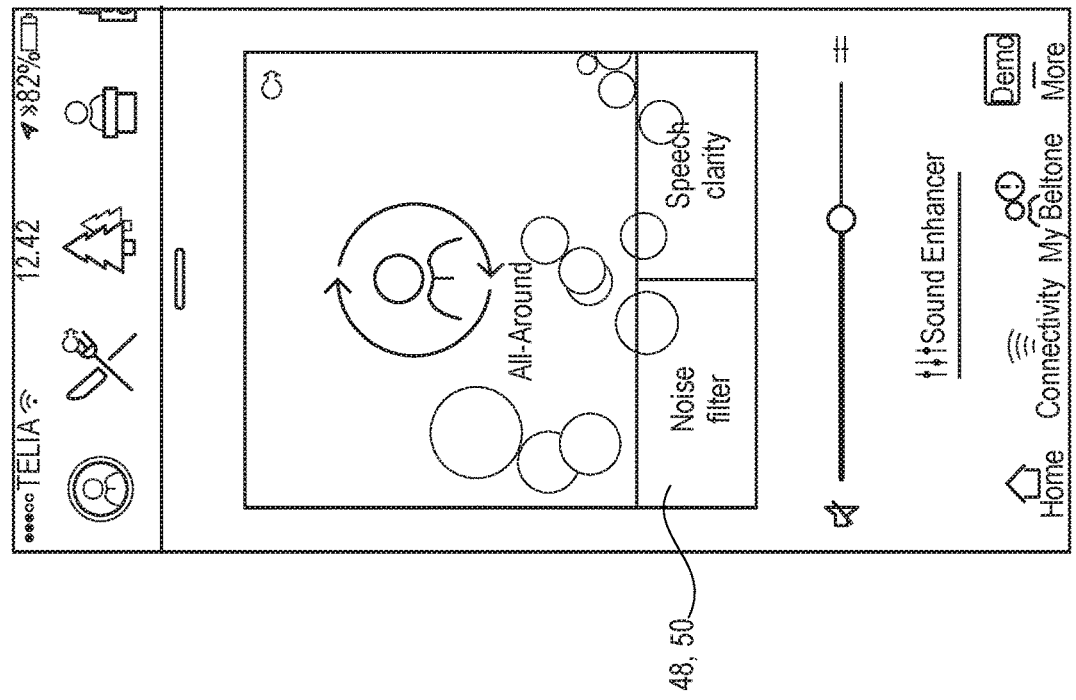

FIG. 8 schematically illustrates an example of user interfaces 48 of an application 50 on an electronic device with a touch sensitive screen. The application 50 is for a user to transmit a service request 4 regarding an unsatisfactory output signal in the user's hearing device. The service request 4 is transmitted via a server to a computing program. The user interfaces 48 show pages of a questionnaire which the user fills in to describe the listening problem and when it occurs.

Figure 9:
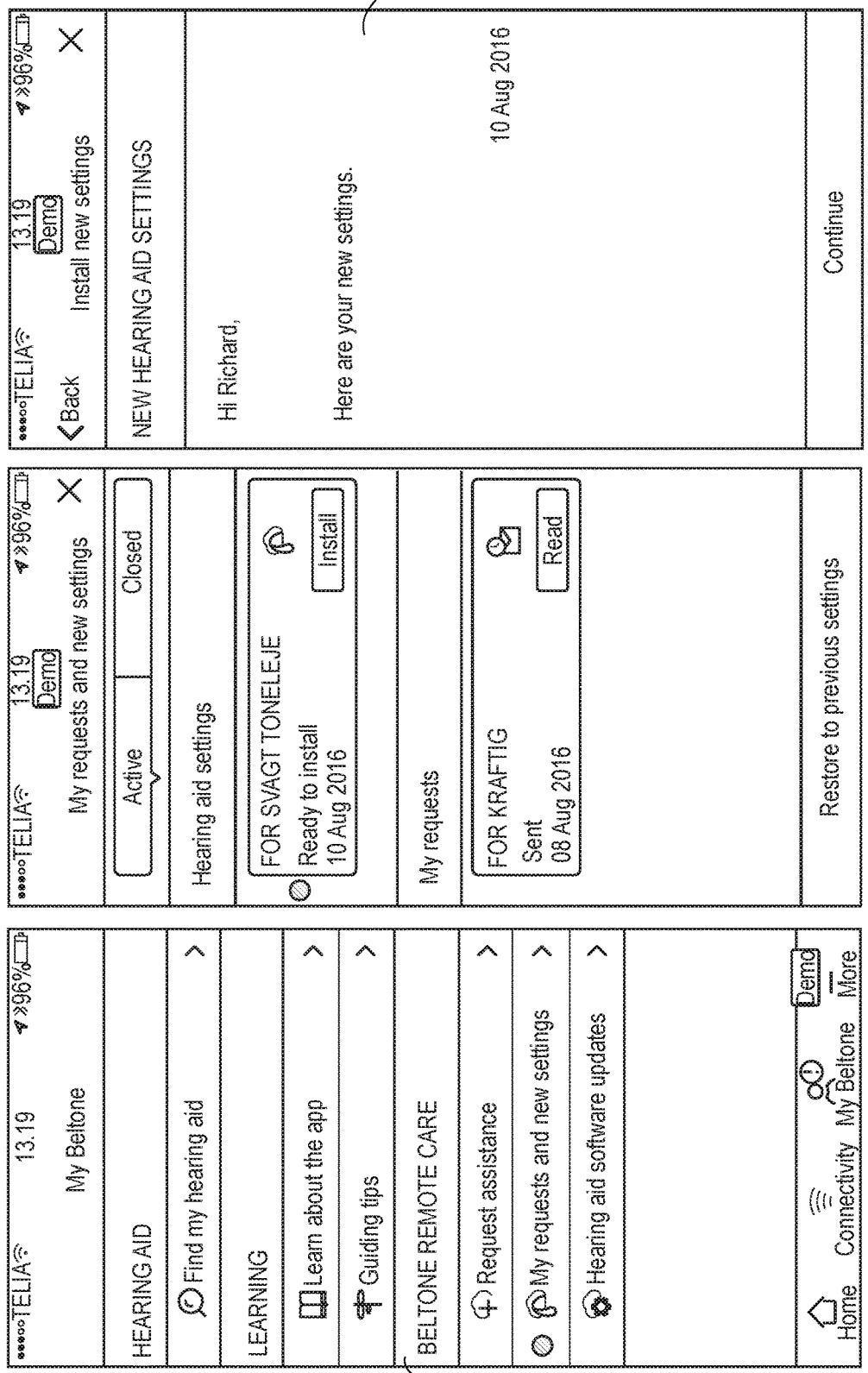
FIG. 9 schematically illustrates an example of user interfaces of an application for a user to receive and install a response to a service request.
Figure 9:
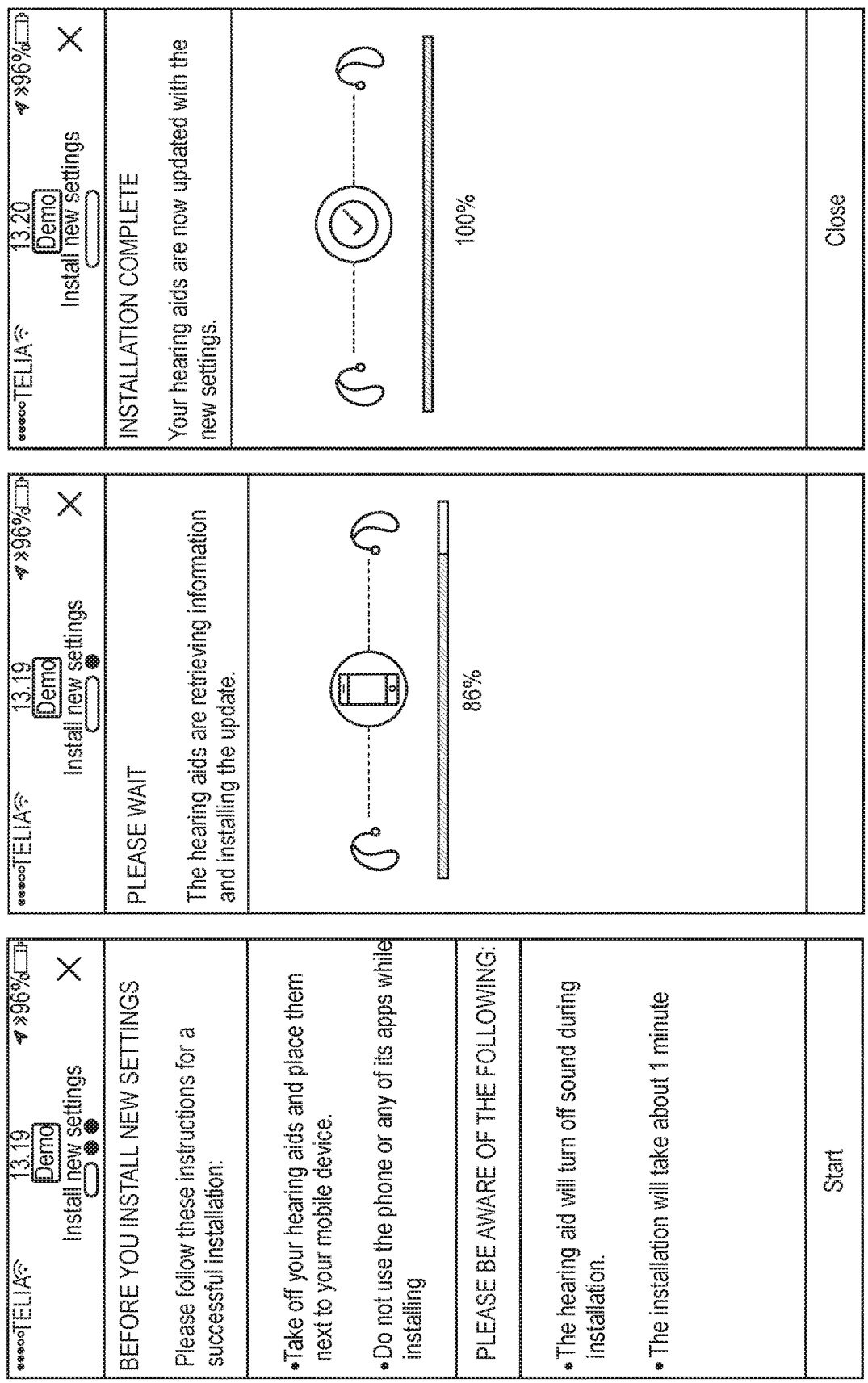

FIG. 9 schematically illustrates an example of user interfaces 48 of an application 50 on an electronic device with a touch sensitive screen. The application 50 is for a user to receive and install a response 22 to a service request regarding an unsatisfactory output signal in the user's hearing device. The user interfaces 48 show pages of an installation guide for the user to install the response 22 transmitted via a server from a computing program.

Figure 10:
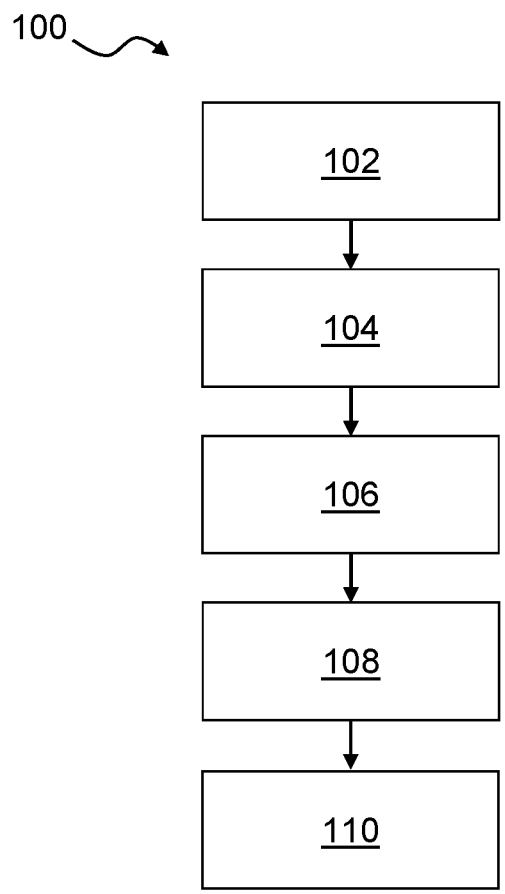
FIG. 10 schematically illustrates a method in a system for processing a service request regarding an unsatisfactory output signal in a hearing device.

FIG. 10 schematically illustrates a method 100 in a system for processing a service request regarding an unsatisfactory output signal in a hearing device. The system comprises a hearing device configured to be worn by a user, the hearing device comprising a processing unit configured to receive an input signal and provide a processed output signal for compensating a hearing loss of a user. The system comprises an electronic device configured to communicate with the hearing device. The system comprises a server configured for communicating with the electronic device, wherein the server comprises one or more of: a plurality of initial fitting parameters of the hearing device, a plurality of audiograms of the user, and/or a plurality of current settings of the hearing device. The system comprises a computing program comprised by or connected to the server.

The method comprises transmitting 102 a service request from an electronic device to a server upon a detection of an unsatisfactory processed output signal in the hearing device.

The method comprises transmitting 104, from the server, the service request and one or more of the initial fitting parameters of the hearing device, audiograms, and/or current settings of the hearing device, to the computing program.

The method comprises processing 106 the service request in a computing program.

The method comprises providing 108 a response to the service request based at least in part on at least one of the initial fitting parameters of the hearing device, audiograms, and/or current settings of the hearing device.

The method comprises transmitting 110 the response from the computing program to the hearing device via the server and via the electronic device.

Exemplary systems, methods, and applications are set out in the following items:

1. A system for processing a service request regarding an unsatisfactory output signal in a hearing device, the system comprising:

a hearing device configured to be worn by a user, the hearing device comprising a processing unit configured to receive an input signal and provide a processed output signal for compensating a hearing loss of a user;

an electronic device configured to communicate with the hearing device;

a server configured for communicating with the electronic device, wherein the server comprises one or more of: a plurality of initial fitting parameters of the hearing device, a plurality of audiograms of the user, and/or a plurality of current settings of the hearing device;

a computing program comprised by or connected to the server;

wherein the electronic device is configured to transmit a service request to the server upon a detection of an unsatisfactory processed output signal;

where the server is configured to transmit the service request and one or more of the initial fitting parameters of the hearing device, audiograms, and/or current settings of the hearing device, to the computing program;

wherein the computing program is configured to process the service request and provide a response to the service request based at least in part on at least one of the initial fitting parameters of the hearing device, audiograms, and/or current settings of the hearing device;

where the computing program is configured to transmit the response to the hearing device via the server and via the electronic device.

2. A system according to the preceding item, wherein the service request comprises a representation of sound from the location of the user.

3. A system according to the preceding item, wherein the representation of sound is recorded by the electronic device.

4. A system according to any of the preceding items, wherein the response to the service request comprises a suggestion for a fine-tuning of the initial fitting parameters of the hearing device and/or of the current settings of the hearing device.

5. A system according to the preceding item, wherein the hearing device is configured to execute the suggested fine-tuning.

6. A system according to any of the preceding items, wherein the unsatisfactory output signal is caused by a current sound environment.

7. A system according to any of the preceding items, wherein a feedback from the user regarding whether the fine-tuning provides a satisfactory output signal in the current sound environment is provided to the computing program.

8. A system according to any of the preceding items, wherein the server comprises data comprising service requests, responses to the service requests and/or feedback from a plurality of hearing device users.

9. A system according to the preceding item, wherein the computing program is configured to apply a machine learning method to the data comprising service requests, responses to the service requests and/or feedback from a plurality of hearing device users.

10. A system according to the preceding item, wherein the computing program is configured to provide the response to the service request at least in part based on the machine learning method.

11. A system according to the preceding item, wherein providing the response to the service request comprises determining a cause of the unsatisfactory output signal and determining the suggested fine-tuning of the initial fitting parameters of the hearing device and/or of the current settings of the hearing device.

12. A system according to any of the preceding items, wherein the transmission of the service request is user-initiated or initiated by the hearing device.

13. A system according to any of the preceding items, wherein the service request comprises input from the user in the form of user speech and/or entered user input in text-form.

14. A system according to any of the preceding items, wherein the response to the service request comprises a notification that no fine-tuning is suggested.

15. A system according to the preceding items, wherein when no fine-tuning is suggested, the user is recommended to contact a hearing care professional and/or a hearing care professional is instructed to contact the user.

16. A method in a system for processing a service request regarding an unsatisfactory output signal in a hearing device, the system comprising:
a hearing device configured to be worn by a user, the hearing device comprising a processing unit configured to receive an input signal and provide a processed output signal for compensating a hearing loss of a user;
an electronic device configured to communicate with the hearing device;
a server configured for communicating with the electronic device, wherein the server comprises one or more of: a plurality of initial fitting parameters of the hearing device, a plurality of audiograms of the user, and/or a plurality of current settings of the hearing device;
a computing program comprised by or connected to the server; wherein the method comprising:
transmitting a service request from an electronic device to a server upon a detection of an unsatisfactory processed output signal in the hearing device;
transmitting, from the server, the service request and one or more of the initial fitting parameters of the hearing device, audiograms, and/or current settings of the hearing device, to the computing program;
processing the service request in a computing program;
providing a response to the service request based at least in part on at least one of the initial fitting parameters of the hearing device, audiograms, and/or current settings of the hearing device;
transmitting the response from the computing program to the hearing device via the server and via the electronic device.

17. An application to be executed by an electronic device, where the electronic device is configured to communicate with a hearing device, the hearing device is configured to be worn by a user, the hearing device comprising a processing unit configured to receive an input signal and provide a processed output signal for compensating a hearing loss of a user; the application is configured for:
transmitting a service request from the electronic device to a computing program via a server upon a detection of an unsatisfactory processed output signal in the hearing device;
receiving, in the electronic device, a response, from the computing program via the server, to the service request based at least in part on at least one of a plurality of initial fitting parameters of the hearing device, a plurality of audiograms of the user, and/or a plurality of current settings of the hearing device;
receiving, in the electronic device, a feedback from the user regarding whether the response to the service request comprising a suggestion for a fine-tuning of the initial fitting parameters of the hearing device and/or of the current settings of the hearing device provides a satisfactory output signal in the current sound environment; and
transmitting the feedback from the electronic device to the server and/or to the computing program via the server.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

LIST OF REFERENCES 2 system
4 service request
6, 6' hearing device
8 user
10 processing unit
12 electronic device
14 server
16 initial fitting parameters, audiograms and/or current settings
18 computing program
20 transmit service request
22 response
24 transmit response
26 representation of sound
28 suggestion for fine-tuning
30 feedback
32 data
34 input from the user
36 touch sensitive screen
38 microphone in electronic device
40 input transducer in hearing device
42 output transducer in hearing device
44 transceiver in hearing device
46 antenna in hearing device
48 user interface on electronic device
50 application on electronic device
100 method
102 method step: transmitting a service request from an electronic device to a server upon a detection of an unsatisfactory processed output signal in the hearing device;
104 method step: transmitting, from the server, the service request and one or more of the initial fitting parameters of the hearing device, audiograms, and/or current settings of the hearing device, to the computing program;
106 method step: processing the service request in a computing program;
108 method step: providing a response to the service request;
110 method step: transmitting the response from the computing program to the hearing device via the server and via the electronic device.

The invention claimed is:
1. A system for improving a performance of a hearing device, the hearing device configured to be worn by a user, the hearing device comprising a processing unit configured to receive an input signal and provide an output signal for compensating a hearing loss of the user, the system comprising;
a database comprising one or more of: a plurality of initial fitting parameters of the hearing device, audiogram(s), a plurality of current settings of the hearing device, or any combination of the foregoing;
a communication interface configured to receive a request regarding the hearing device, the request being based upon a detection of an unsatisfactory performance of the hearing device; and
a response generator configured to process the request and generate a response without requiring an involvement of a health care professional based at least in part on one or more of the initial fitting parameters of the hearing device, the audiogram(s), one or more of the current settings of the hearing device, or any combination of the foregoing, wherein the system is configured to output the response for wireless transmission, and wherein the response comprises information regarding an adjustment for improving a performance of the hearing device.

2. The system according to claim 1, wherein the request comprises a representation of sound from a location of the user.

3. The system according to claim 2, wherein the representation of the sound is recorded by an electronic device that is different from the hearing device.

4. The system according to claim 1, wherein the response comprises a suggestion for adjustment of at least one of the initial fitting parameters of the hearing device and/or of at least one of the current settings of the hearing device.

5. The system according to claim 1, further comprising the hearing device, wherein the hearing device is configured to execute the adjustment.

6. The system according to claim 1, wherein the unsatisfactory performance is caused by a current sound environment.

7. The system according to claim 1, wherein the response is configured to cause an adjustment of at least one of the initial fitting parameters of the hearing device and/or at least one of the current settings of the hearing device.

8. The system according to claim 7, wherein the system is configured to receive a feedback from the user regarding whether the adjustment provides a satisfactory output signal in a current sound environment.

9. The system according to claim 1, wherein the database comprises multiple requests, multiple responses to the multiple requests respectively, feedback from multiple hearing device users, or any combination of the foregoing;
wherein the multiple requests include the request received by the communication interface, the multiple responses include the response generated by the response generator, and the multiple hearing device users include the user of the hearing device.

10. The system according to claim 1, wherein the response generator is configured to perform machine learning based on multiple requests, multiple responses to the multiple requests respectively, feedback from multiple hearing device users, or any combination of the foregoing;
wherein the multiple requests include the request received by the communication interface, the multiple responses include the response generated by the response generator, and the multiple hearing device users include the user of the hearing device.

11. The system according to claim 1, wherein the response generator is configured to provide the response based at least in part on machine learning.

12. The system according to claim 1, wherein the response generator is configured to:
determine a cause of the unsatisfactory performance, and
determine a recommendation for adjusting the one or more of the initial fitting parameters of the hearing device and/or the one or more of the current settings of the hearing device.

13. The system according to claim 1, wherein the request is user-initiated or initiated by the hearing device.

14. The system according to claim 1, wherein the request comprises an input from the user, the input being in a form of speech and/or text.

15. The system according to claim 1, wherein the response comprises a recommendation for adjusting a frequency, a noise reduction, an enhanced speech, a directionality, a focus beam, a sound level, or any combination of the foregoing.

16. The system according to claim 1, wherein the response indicates that no adjustment for improving the performance of the hearing device is needed.

17. The system according to claim 1, wherein the system is configured to output the response for reception by an electronic device.

18. The system according to claim 17, wherein the electronic device is configured to communicate with the hearing device.

19. The system according to claim 18, further comprising the electronic device.

20. An electronic device, comprising:
a communication interface configured to communicate with a hearing device, the hearing device configured to be worn by a user, the hearing device comprising a processing unit configured to receive an input signal and provide an output signal for compensating a hearing loss of the user;
a processing unit configured to generate a request, the request being based upon a detection of an unsatisfactory performance of the hearing device, wherein the processing unit is also configured to receive a wireless response that is generated in response to the request, the response being based at least in part on one or more of a plurality of initial fitting parameters of the hearing device, audiogram(s), one or more of a plurality of current settings of the hearing device, or any combination of the foregoing; and
a screen configured to display information regarding an adjustment for improving a performance of the hearing device.

21. A product having a set of instructions, an execution of which by an electronic device will cause a process to be performed, wherein the electronic device is configured to communicate with a hearing device, the hearing device configured to be worn by a user, the hearing device comprising a processing unit configured to receive an input signal and provide an output signal for compensating a hearing loss of the user, the process comprising:
transmitting a request from the electronic device, the request being based upon a detection of an unsatisfactory performance of the hearing device;
receiving, in the electronic device, a response from a server, wherein the response is generated without requiring an involvement of a health care professional and is generated based at least in part on one or more of a plurality of initial fitting parameters of the hearing device, audiogram(s), one or more of a plurality of current settings of the hearing device, or any combination of the foregoing;
receiving, in the electronic device, a feedback from the user regarding whether an adjustment of at least one of the initial fitting parameters of the hearing device and/or of at least one of the current settings of the hearing device, based on the response provides a satisfactory output signal; and
transmitting the feedback from the electronic device to the server.

* * * * *